United States Patent [19]

Spies et al.

[11] Patent Number: 5,696,776
[45] Date of Patent: Dec. 9, 1997

[54] DATA TRANSMISSION METHOD IN A REAL-TIME DATA PROCESSING SYSTEM

[75] Inventors: Hans Spies, Pfaffenhofen; Peter Hora, Schrobenhausen; Günter Fendt, Schrobenhausen; Derrik Zechmair, Schrobenhausen, all of Germany

[73] Assignee: Temic Telefunken microelectronic GmbH, Heilbronn, Germany

[21] Appl. No.: 502,458

[22] Filed: Jul. 14, 1995

[30] Foreign Application Priority Data

Jul. 16, 1994 [DE] Germany ............... 44 25 254.4

[51] Int. Cl.$^6$ .................................................. G06F 7/02
[52] U.S. Cl. .................................. 371/67.1; 371/57.2
[58] Field of Search ................. 371/21.1, 21.2, 371/21.3, 25.1, 24, 57.2, 67.1, 20.5, 69.1, 20.1

[56] References Cited

U.S. PATENT DOCUMENTS

| | | | |
|---|---|---|---|
| 3,961,254 | 6/1976 | Cavaliere et al. | 371/22.3 |
| 4,511,967 | 4/1985 | Witalka et al. | 395/821 |
| 4,575,674 | 3/1986 | Bass et al. | 395/183.06 |
| 4,759,022 | 7/1988 | Akerberg | 371/69.1 |
| 4,771,282 | 9/1988 | Hamano et al. | 340/825.22 |
| 4,802,214 | 1/1989 | Barany | 380/15 |
| 4,912,395 | 3/1990 | Sato et al. | 371/21.2 |
| 5,311,138 | 5/1994 | Ott et al. | 324/503 |
| 5,339,343 | 8/1994 | Hashimoto | 377/29 |

FOREIGN PATENT DOCUMENTS

| | | |
|---|---|---|
| 0 536 557 | 4/1993 | European Pat. Off. . |
| 1280929 | 10/1968 | Germany . |
| 2527098 | 12/1976 | Germany . |
| 2946163 B1 | 5/1981 | Germany . |
| 3639609 A1 | 5/1987 | Germany . |
| 3639065 A1 | 5/1988 | Germany . |
| 4111918 C1 | 10/1992 | Germany . |
| 4114999 A1 | 11/1992 | Germany . |
| 4115647 A1 | 11/1992 | Germany . |
| 4220247 A1 | 12/1993 | Germany . |
| 4226309 A1 | 2/1994 | Germany . |
| 4326498 A1 | 3/1994 | Germany . |
| 2085171 | 4/1982 | United Kingdom . |

OTHER PUBLICATIONS

Martin, James; "Die Organisation von Datennetzen"; Carl Hanser Verlag, München, 1972, S. 68.

*Primary Examiner*—Phung Chung
*Attorney, Agent, or Firm*—Spencer & Frank

[57] ABSTRACT

A data transmission method in a real-time data processing system, comprising a control unit and at least one function unit linked to this control unit through a data line, is described that permits noise-free and noise-insensitive transmission of data. In accordance with the invention, the data is stored in a buffer memory made up of a shift register and an intermediate storage, before being loaded into a main memory of the function unit. Transfer to the intermediate storage takes place only if certain conditions are satisfied that identify transmission faults. Before the data is stored in the main memory, the data is read-back into the control unit memory for the purposes of checking and there it is compared with the original data. If there is no correspondence, data transmission is performed again. The method in accordance with the invention can be applied advantageously in local networks, and in particular for motor vehicles, where a central control unit is applied for controlling operational sequences through various function units such as triggering circuits for passenger restraint systems or control circuits concerning motor management.

17 Claims, 5 Drawing Sheets

| FUNCTION | SE0 | SE1 |
|---|---|---|
| RESET COUNTERS TO ZERO | 0 | 0 |
| SHIFT REGISTER R01 READY FOR READ / WRITE | ⌐ | 0 |
| STROBE-SIGNAL | 1 | 1 |
| READ-BACK | 1 | ⌐ |

FIG.2a

| FUNCTION | SE0 | SE1 |
|---|---|---|
| RESET COUNTERS TO ZERO | 0 | 0 |
| SHIFT REGISTER R11 READY FOR READ / WRITE | 0 | ⌐ |
| STROBE-SIGNAL | 1 | 1 |
| READ-BACK | ⌐ | 1 |

FIG.2b

DATA TRANSMISSION METHOD IN A REAL-TIME DATA PROCESSING SYSTEM

BACKGROUND OF THE INVENTION

The invention relates to a data transmission method in a real-time data processing system, comprising a control unit and at least one function unit linked to the control unit through a data line.

In motor vehicles, electronically controlled systems are being used to an increasing extent in order to be able to assure optimum setting of all motor vehicle functions in real time. As a rule, these systems are monitored and controlled from a central control unit.

A system of this kind performs, for example, a computer-controlled ignition process in real time by calculating an ignition angle for each ignition process in accordance with certain data supplied from sensors. This ignition angle information is supplied in the form of digital data through bus lines to the respective function unit. At the same time, data transmission should be effected with noise immunity.

Another system relates to safety-relevant systems in the motor vehicle, in particular passenger restraint systems such as belt tighteners, airbags and rollbars. It is important here that the control signals between the central control unit and the output stages that drive the triggering means (for instance the ignition pill of the ignition unit for an airbag) should, when being triggered, be transmitted dependably and without susceptibility to noise even though the most extreme disturbance conditions are present. Otherwise, passenger protection would not be guaranteed in all cases in the event of falsely transmitted output stage control signals.

SUMMARY OF THE INVENTION

The object of the invention is to provide a data transmission method for a real-time data processing system comprising a control unit and at least one function unit (which can be contained on the same printed circuit board) linked to the control unit through a data line, permitting dependable data transmission with a minimum of noise susceptibility in spite of the most disadvantageous disturbing influences and which can be provided with a minimum of circuitry.

According to the invention, the data to be transmitted from the control unit to the main memory of the function unit are not loaded directly into the main memory but deposited first of all in a buffer memory which is made up of a shift register and a temporary storage connected behind it. The data to be transmitted are first of all read-in serially to the shift register and then transferred to the temporary storage. For safety reasons, the data stored in the temporary storage are now read-back to the shift register and transmitted serially from there to the control unit so that a comparison is possible between this data and the data originally output from the control unit. If the compared data correspond, this data is transferred from the temporary storage to the main memory of the function unit. Since transfer of the data to the main memory takes place only if the previously performed data matching has been completed successfully, there is no risk of falsified data being read into the main memory of the function unit as a result of disturbance factors during data transmission. This means that, in spite of serial data transmission, information transfer can take place without disturbance, so that, when compared with parallel data transmission that as a rule allows dependable data transmission, a number of connections on the function unit are no longer required, and consequently the costs are reduced.

In order to increase noise immunity at the time of data transmission, it is advantageous in accordance with a further embodiment of the invention to count the necessary clock pulses of the data to be transmitted into the shift register when reading in serially and then to permit transfer of this data into the temporary storage only if the number of these clock pulses has a certain value that corresponds to the number of the register cells in the shift register.

Similarly, this method can be applied successfully for the disturbance-free data transmission when reading back the data from the temporary storage by also counting the necessary number of clock pulses when serially reading out the data from the shift register and permitting transfer of the data to the main memory, if a specific number of clock pulses is also available in addition to the positive results of the compare operation.

In a further advantageous embodiment of the data transmission method, the data record to be transmitted can be provided with an identification code that is checked by the function unit after reading into the shift register. If the identification code is identified as being correct, the data transfer to the temporary storage is permitted, unless the additional condition exists for "correct number of pulses". Through this additional condition that governs data transfer from the shift register into the intermediate storage, a further improvement is obtained for noise immunity during data transmission. If several function units are driven by the control unit, this identification code can also be used to label data in terms of their association with the various function units.

If the conditions for transmitting data from the shift register to the temporary storage are not satisfied, for instance if the identification code has not been found to be correct or if the required number of clock pulses has not been confirmed, the transmission method is restarted by the control unit in that the data to be transmitted is read into the shift register once again. This is performed preferably in such a way that all places in the shift register are first of all written with the same logical values and then this data is read-out from the shift register into a memory of the control unit. The comparison of the false data with the data originally output from the control unit now leads to the result that there is no correspondence and therefore the control unit now starts to transmit the data again.

The attempt to transmit data is repeated even if the conditions for transfer to the main memory do not exist, that is if the required number of clock pulses on reading-in or reading-back to the memory of the control unit have not been reached or if the data read-back does not correspond to the original data.

Furthermore, in another advantageous embodiment of the invention, the readiness to transfer the data read into the shift register to the temporary storage can be indicated by a strobe signal generated by the control unit. If a strobe signal of this kind causes the data to be successfully read into the intermediate storage, the cancellation of this strobe signal by the control unit causes the read-back operation to commence. If the read-back operation has been successfully concluded, then in a last advantageous embodiment of the invention, transfer of the data to the main memory can take place by an enable signal generated by the control unit.

BRIEF DESCRIPTION OF THE DRAWINGS

The method according to the invention will be shown and described below on the basis of an embodiment example together with the drawings, wherein:

FIGS. 2A and 2B show two command tables for transmission of data between the control unit and the function units;

DESCRIPTION OF THE PREFERRED EMBODIMENTS

Figure 1:
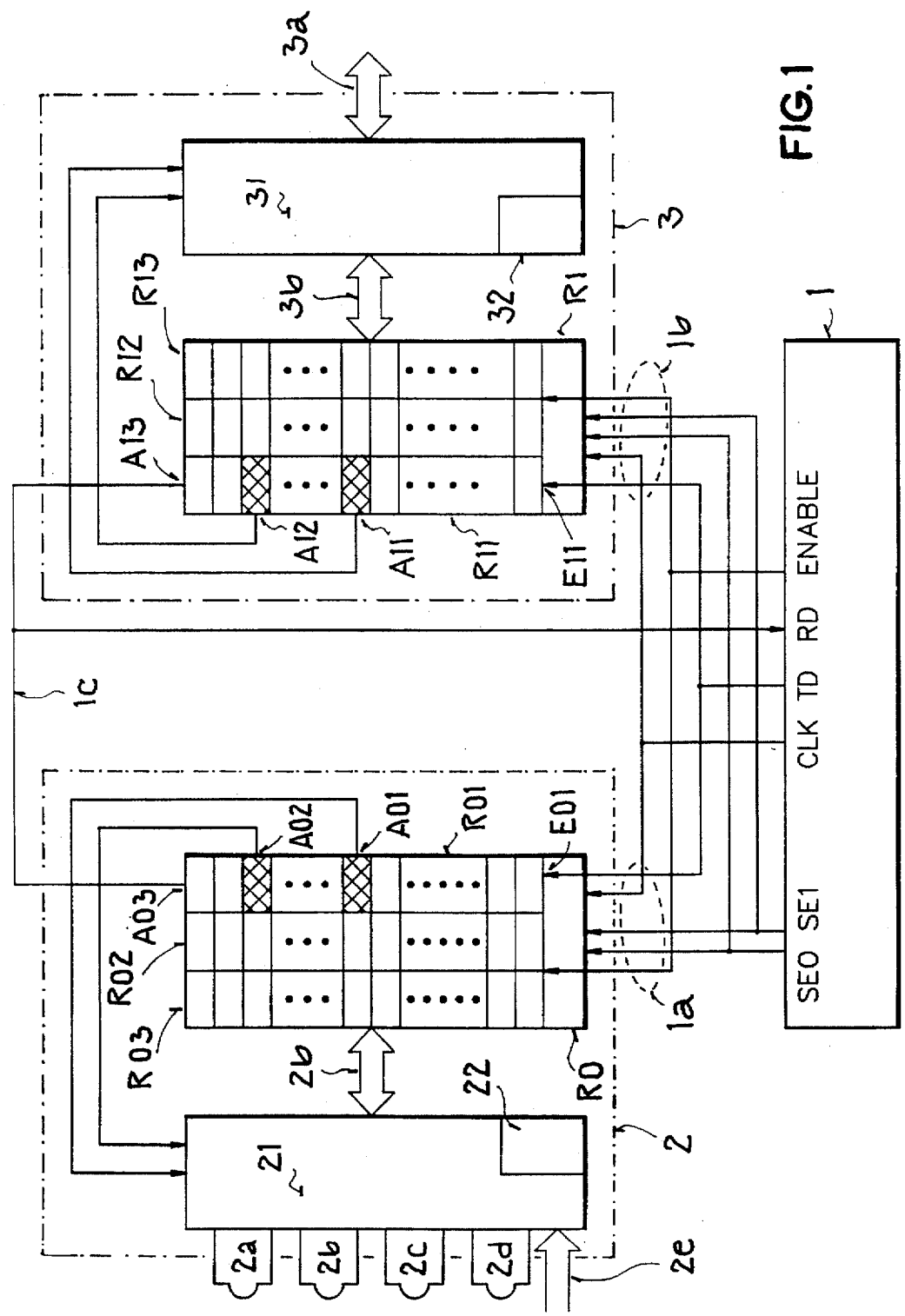
FIG. 1 is a block diagram of a data processing system for a motor vehicle with a control unit and two function units connected together through data lines.

The data processing system in accordance with FIG. 1, as it is employed in a motor vehicle for example, shows a central control unit 1 that is linked through data lines with two function units (possibly on the same printed circuit board) 2 and 3.

The function unit 2 assumes the function of a triggering circuit of a passive passenger protection system for vehicles in the event of a crash. An interface and output-stage circuit 21 directly controls the driver and front-seat passenger airbags 2a and 2b as well as the belt tighteners 2c and 2d for driver and passenger, and these must be considered to be actuators. In addition, other safety functions such as side airbags for driver and front-seat passenger as well as a rollbar can also be implemented. Finally, appropriate sensor signals 2e which, for example, concern the seating identification, may be supplied to this circuit 21. The function unit 2 also includes a register R0 made up of a shift register R01, an intermediate register R02 and a main memory R03, each with n-bit places, where n can have a value of 16, for example. The data between circuit 21 and register R0 is exchanged through a data line 2b. The shift register R01 has not only a serial input E01 and a serial output A03 but also two parallel outputs A01 and A02 the outputs of which are connected to the interface and output-stage circuit 21. The data exchange with the control unit 1 is obtained through data lines 1a, while the data read-out through the serial output A03 of shift register R01 are supplied to the control unit 1 through a line 1c.

The function unit 3 is similarly built up with a register R1, which in turn has a shift register R11, an intermediate register R12 and a working register R13, and also with an interface and output stage circuit 31. The register R1 and the above-mentioned circuit 31 communicate with each other through a data line 3b. This function unit 3 performs, for instance, motor management, thus controlling in particular the actuators determining the ignition angle through a data line 3a connected to the circuit 31. Like the shift register R01 of function unit 2, the shift register R11 of the function unit 3 also has a serial input E11, a serial output A13 and also two parallel outputs A11 and A12, the two last-named outputs being connected to the interface and output stage circuit 31. The data exchange with the control unit 1 takes place through data lines 1b and through the above-mentioned data line 1c.

The data transmission process between control unit 1 and one of the two registers R0 or R1 in accordance with the invention will now be described below with the help of the flowchart shown in FIG. 3 and the command tables given in FIG. 2. The control of the transmission of data from control unit 1 to register R0 or R1 takes place by means of two control signals SE0 and SE1 which are available at outputs of the same name on control unit 1 and which are supplied through the above-mentioned data lines 1a and 1b to the two registers R0 and R1. For controlling the various sequences, a clock signal is supplied to the registers R0 and R1 through a clock-pulse output CLK on control unit 1. Furthermore, the data to be transferred to register R0 or R1 are supplied to an output TD on control unit 1. The data read-out through output A03 or A13 of shift register R01 and R11 respectively are supplied to an output RD on control unit 1. Finally, the control unit 1 generates an enable signal on an output designated by the same name.

If registers R0 and R1, for example, each have 16 places, then 16-bit data blocks are also transferred in each case. The data transmission commences in accordance with flowchart 3 with the function "reset counters to 0" with the commands SE0=0 and SE1=0 in accordance with the command tables of FIGS. 2a and 2b. These counters are part of the interface and output-stage circuit 21 and 31 respectively and they are designated by references 22 and 32. Now the register is selected to which the 16-bit data block is to be transferred. The corresponding control level for the control signals SE0 and SE1 can also be taken from the command tables shown in FIGS. 2a and 2b.

If, for example, shift register R01 is to be selected, then the control signal SE0 changes from a logical "0" (LOW level) to a logical "1" (HIGH level) and control signal SE1 continues to have a logical "0" (refer to FIG. 2a, function "Shift register R01 ready for read/write"). If the other shift register R11 is selected, the corresponding signal level of control signals SE0 and SE1 must be generated in accordance with FIG. 2b. The 16-bit data block is then read into the selected shift register R01 with 16 clock pulses. The 16-bit data block includes two identification bits which are at the corresponding bit places of shift register R01 with the two parallel outputs A01 and A02. These identification bits represent a data code and are supplied in order to verify the interface and output stage circuit 21. In order for the 16-bit data block read into the shift register R01 to be transmitted to the intermediate register R02 by means of a strobe signal, on the one hand the given data code must match and on the other hand the counter 22 must have a counter reading 16. The identification bits can, for example, each be logical "0". If the data code matches and if at the same time the counter reading is correct, then the strobe signal (see FIG. 2a: SE0=1 and SE1=1) causes the 16-bit data block to be transferred to the intermediate storage R02 and at the same time the counter 22 is enabled for further clock pulsing up to counter reading 32 (see FIG. 3).

A measure designed to ensure noise-free data transmission will now be described, namely the cross-reading of the data written into the intermediate memory R02 by the control unit and comparison of this data with the data originally output from the control unit 1 (see FIG. 3). The, relevant flowchart "cross-reading and comparison of data" is provided in FIG. 4. In addition, the strobe signal is canceled in accordance with the command table shown in FIG. 2a, i.e., the control signal SE1 changes from logical "1" back to logical "0". Consequently, the 16-bit data block is immediately read-back from the intermediate register R02 into the shift register R01. This 16-bit data block is then read-out through line 1c and stored in a corresponding memory of the control unit 1. At the same time, counter 22 increments the number of clock pulses required for reading out by a corresponding amount. The control unit 1 now performs a comparison between the data read-out and the data output through output TD. If these two 16-bit data blocks correspond and if at the same time the counter reading of counter 22 reveals a counter reading of 32, then the 16-bit data block can be transferred to the main memory R03 with an enable signal generated by the control unit 1. Data transfer has then been concluded.

Figure 3:
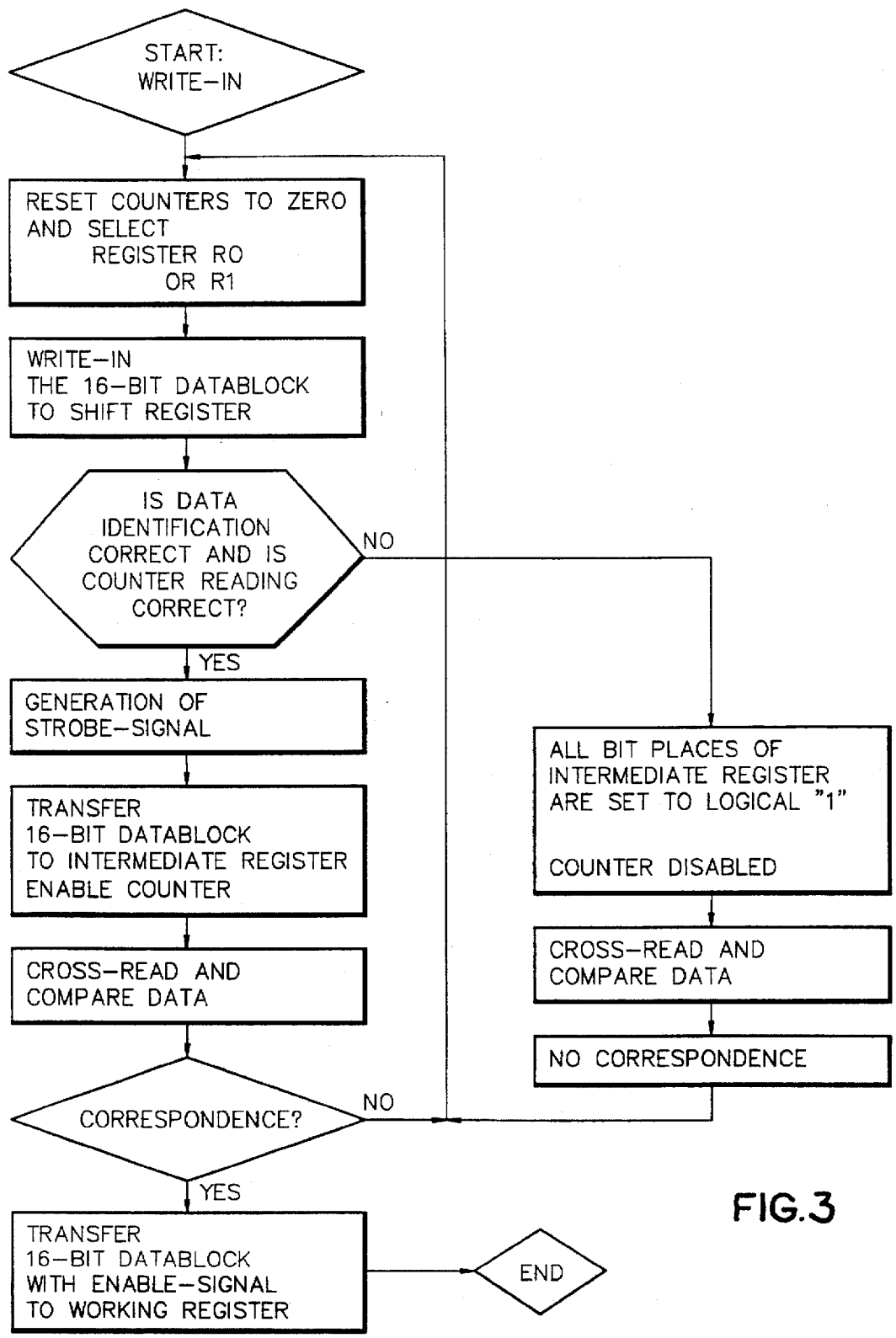
FIG. 3 is a flowchart for writing data into a function unit.
Figure 4:
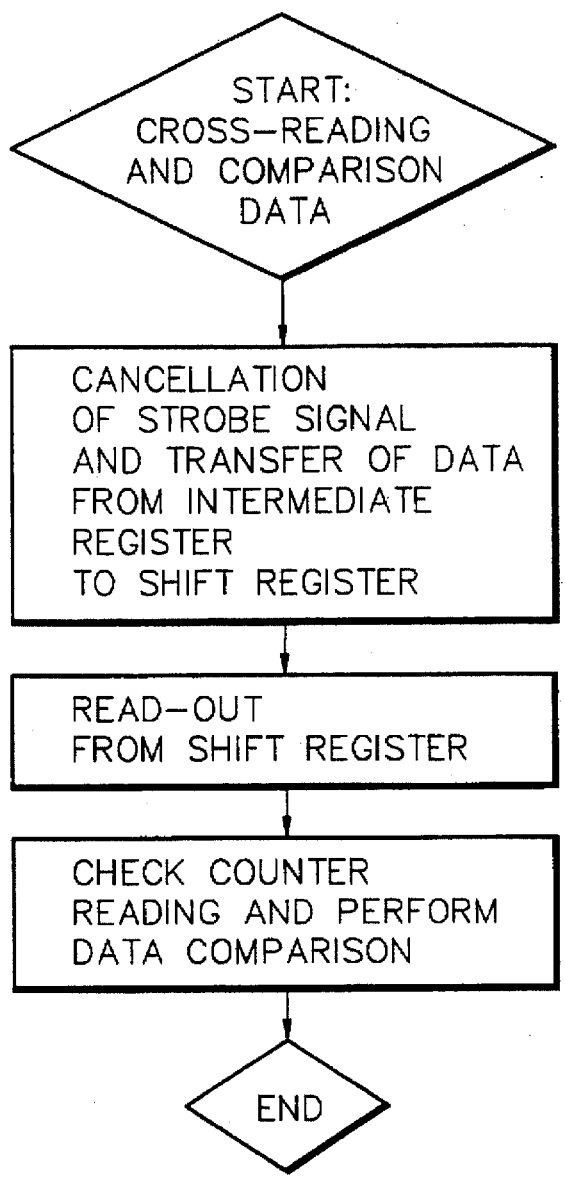
FIG. 4 is a flowchart for performing the function "cross-reading"

If on the other hand, there is no correspondence between the data or if the value of the counter reading is not 32, then the data transmission process starts again as shown in FIG. 3.

If a strobe signal for the transmission of the 16-bit data block to the intermediate register R02 cannot be generated because the data code does not correspond or because the counter reading is incorrect, then in accordance with FIG. 3 all bit places of the intermediate register R02 are written with a logical "1" and at the same time counter 22 is disabled. Now the measure "Cross-reading and comparison of data" is performed in accordance with the flowchart shown in FIG. 4. Because incorrect data is now necessarily being read-out from the shift register, and since in particular there are incorrect identification bits, the data comparison does not result in correspondence. In this case also, as shown in FIG. 3, data transmission is repeated.

The data contents of the 16-bit data blocks to be transmitted can concern, for example, triggering of the airbag or it can initiate the performance of a check cycle.

Figure 5:
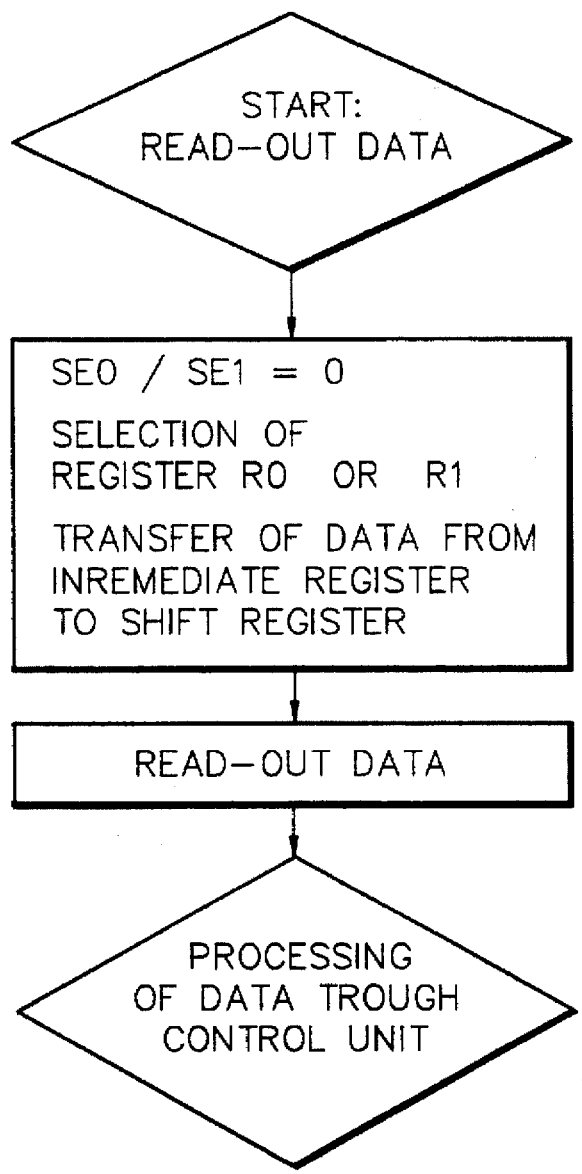
FIG. 5 is a flowchart for transferring data from the function units to the control unit.

The data processing system in accordance with FIG. 1 also provides for the transfer of status information from the interface and output stage circuits 21 and 31 to the control unit 1. After a preceding status interrogation initiated by the control unit, the data read into the intermediate register following appropriate selection of the register in accordance with the command tables shown in FIG. 2 is transferred to the shift register and then read-out through output A03 or A13 and then processed by control unit 1. FIG. 5 shows the flowchart for this.

Thus, noise-free data transmission from control unit 1 to register R0 or R1 is ensured by writing the data to be transferred not directly into the main register R03 or R13 but first of all into the intermediate register R02 or R12 the data contents of which are cross-read and checked before being passed on to working register R03 or R13 respectively.

Data transfer to intermediate register R02 or R12 with a strobe signal or data transfer into main register R03 or R13 respectively with an enable signal is possible for safety reasons only if the internal counters 22 and 32 of function units 2 and 3 have the correct counter readings, in this particular example 16 or 32, and the identification bits, that is the data codes, have been accepted by the relevant function unit. If these conditions apply, then disturbed or falsified data transmission is virtually impossible even under the most extreme conditions of disturbance.

The data processing system shown and described in FIG. 1 for applying the method according to the invention includes 16-bit registers. If demanded of the function units, shorter or longer registers can also be used. It is then simply necessary to adapt the counters involved. Finally, differently from the embodiment example shown in FIG. 1, more than 2 function units can be driven by one control unit 1 provided further control outputs SE2, SE3, . . . are available.

Finally, the data transmission method in accordance with the invention is not only suitable for using data processing systems for motor vehicles but it can also be used in other areas of application, such as computer and telecommunication networks.

What is claimed is:

1. Data transmission method in a real-time data processing system, comprising a control unit and at least one function unit linked to the control unit through a data line, with this function unit in turn driving an actuator, wherein this function unit is made up of a main memory, an intermediate storage and a shift register, and wherein for the transmission of data between the control unit and the function unit, the following process steps are performed:
   a) serial reading-in of data into the shift register, while counting the number of clock pulses required for the reading in of the data;
   b) transfer of the data from the shift register into the intermediate storage only if an identification of the data in the shift register has been found to be correct, and if the counted number of clock pulses required for reading of the data into the shift register has a specific known value;
   c) read-back of the data transferred to the intermediate storage into the shift register;
   d) serial read-out of data from the shift register; and
   e) comparison of the data read-out from the shift register with the data output from the control unit, and transfer of the data to the main memory from the intermediate storage if there is correspondence.

2. Data transmission method in accordance with claim 1, wherein the following process steps are performed instead of process steps d) and e):
   d1) serial read-out of the data from the shift register, in which the number of clock pulses required for reading out are counted; and
   e1) comparison of the read-out data with the data output from the control unit, wherein the data are transferred from the intermediate storage into the main memory if correspondence is established and if the counted number of clock pulses required to read out the data from the shift register has a specified known value.

3. Data transmission method in accordance with claim 2, wherein if the data is not transferred from the intermediate storage to the main memory in accordance with process step e), the data transmission process is performed again with process step a).

4. Data transmission method in accordance with claim 3, wherein the readiness for transfer of the data read into the shift register to the intermediate storage is indicated by a strobe signal generated by the control unit.

5. Data transmission method in accordance with claim 4, wherein the control unit cancels the strobe signal for reading back the data from the intermediate storage to the shift register.

6. Data transmission method in accordance with claim 5, wherein the readiness to transfer the data from the intermediate storage to the main memory is indicated by an enable signal generated by the control unit.

7. Data transmission method in accordance with claim 1, wherein if the data is not transferred from the intermediate storage into the main memory in accordance with process step e), the data transmission method is again performed beginning with process step a).

8. Data transmission method in accordance with claim 7, wherein the readiness for transfer of the data read into the shift register to the intermediate storage is indicated by a strobe signal generated by the control unit.

9. Data transmission method in accordance with claim 8, wherein the control unit cancels the strobe signal for reading back the data from the intermediate storage to the shift register.

10. Data transmission method in accordance with claim 9, wherein the readiness to transfer the data from the intermediate storage to the main memory is indicated by an enable signal generated by the control unit.

11. Data transmission method in a real-time data processing system, comprising a control unit and at least one function unit linked to the control unit through a data line, with this function unit in turn driving an actuator, wherein this function unit is made up of a main memory, an intermediate storage and a shift register, and wherein for the transmission of data between the control unit and the function unit, the following process steps are performed:

a) serial reading-in of data into the shift register;

b) transfer of the data from the shift register into the intermediate storage;

c) read-back of the data transferred to the intermediate memory into the shift register;

d) serial read-out of data from the shift register, while counting the number of clock pulses required for reading out of the data from the shift register;

e) comparison of the data read-out of the shift register with the data output from the control unit, and transferring the data from the intermediate storage into the main memory only if correspondence between the compared data is established and if, simultaneously, the counted number of clock pulses required for reading out of the data from the shift register has a specific known value; and, f) if the data is not transferred from the shift register to the intermediate storage in accordance with process step b), then process step a) is performed again.

12. Data transmission method in accordance with claim 11, wherein if the data is not transferred to the intermediate storage then the following process steps are performed:

g) entering of equal logic values to all bit places of the intermediate storage;

h) read-out of data from the shift register;

i) comparison of the read-out data with the data output from the control unit; and j) repeated execution of the data transmission method beginning with process step a).

13. Data transmission method in accordance with claim 11, wherein if the data is not transferred from the intermediate storage to the main memory in accordance with process step e) then the data transmission process is again performed with process step a).

14. Data transmission method in accordance with claim 13, wherein the readiness for transfer of the data read into the shift register to the intermediate storage is indicated by a strobe signal generated by the control unit.

15. Data transmission method in accordance with claim 14, wherein the control unit cancels the strobe signal for reading back the data from the intermediate storage to the shift register.

16. Data transmission method in accordance with claim 15, wherein the readiness to transfer the data from the intermediate storage to the main memory is indicated by an enable signal generated by the control unit.

17. Data transmission method in a real-time data processing system, comprising a control unit and at least one function unit linked to the control unit through a data line, with this function unit in turn driving an actuator, wherein this function unit is made up of a main memory, an intermediate storage and a shift register, and wherein the transmission of data between the control unit and the function unit comprises the following process steps:

a) serially reading data transmitted by the control unit into the shift register, while counting the number of clock pulses required for the reading in of the data;

b) transferring the data from the shift register into the intermediate storage only if an identification of the data in the shift register has been found to be correct, and if the counted number of clock pulses required for reading of the data into the shift register has a specific known value;

c) reading the data transferred to the intermediate storage back into the shift register;

d) serially reading the data from the shift register and forwarding same to the control unit; and e) in the control unit, comparing the data read-out of the shift register with the original data output transmitted by the control unit, and causing transfer of the data to the main memory from the intermediate storage if the comparison results in correspondence between the compared data.

* * * * *